J. C. HANCOCK.
HORSESHOER.
APPLICATION FILED OCT. 16, 1909.
980,249.
Patented Jan. 3, 1911.
2 SHEETS—SHEET 1.
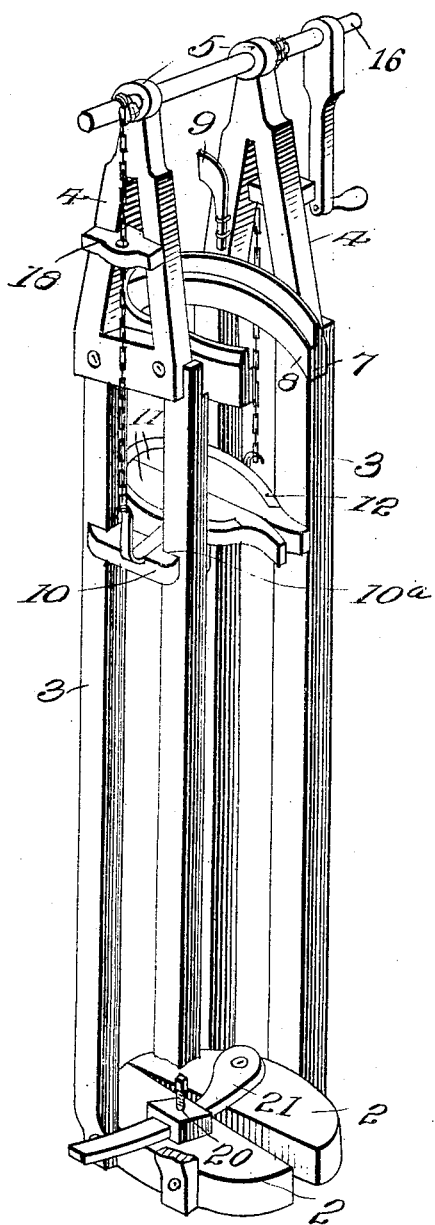
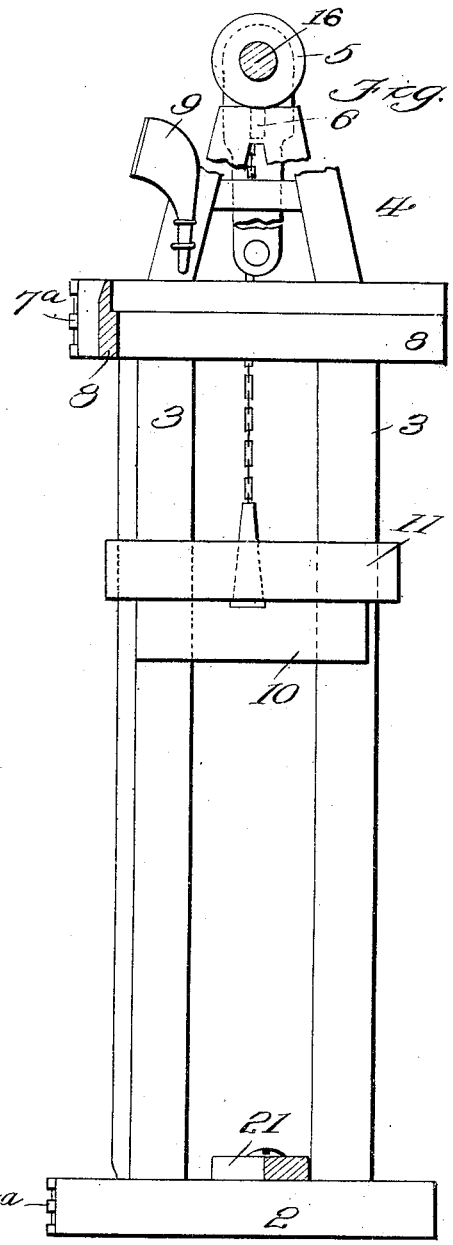
Witnesses
Inventor
J. C. Hancock.
By
Attorney J. C. HANCOCK.
HORSESHOER.
APPLICATION FILED OCT. 16, 1909.
980,249.
Patented Jan. 3, 1911.
2 SHEETS—SHEET 2.
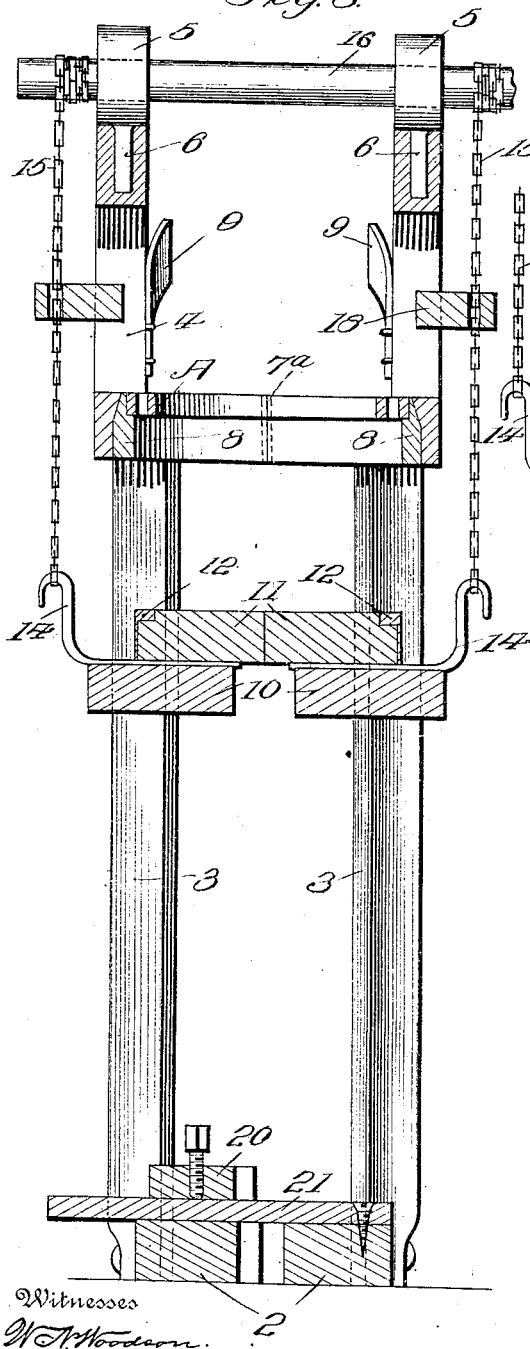
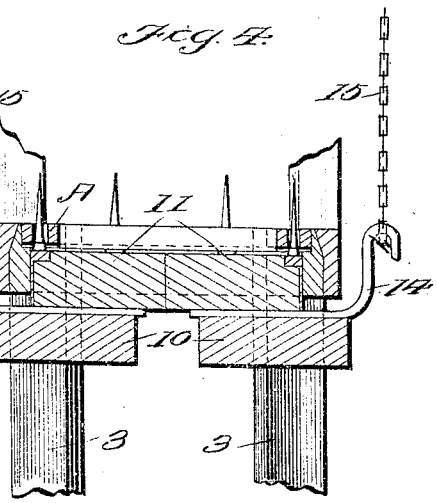
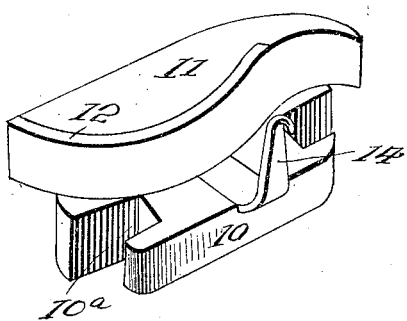
Inventor
J. C. Hancock.

UNITED STATES PATENT OFFICE.

JAMES C. HANCOCK, OF BECKLEY, WEST VIRGINIA.

HORSESHOER.

980,249.

Specification of Letters Patent.  Patented Jan. 3, 1911.

Application filed October 16, 1909. Serial No. 522,998.

*To all whom it may concern:*

Be it known that I, JAMES C. HANCOCK, citizen of the United States, residing at Beckley, in the county of Raleigh and State of West Virginia, have invented certain new and useful Improvements in Horseshoers, of which the following is a specification.

My invention is directed to a mechanism for shoeing horses, the object of the invention being to provide a construction whereby the horse's hoof may be held clamped in position upon a shoe, and the horseshoe nails then gradually forced through the nail holes in the shoe and into the hoof, while the hoof is still clamped in position.

The mechanism includes opposed standards having a shoe seat, nail carriers slidable on the standards and adapted to support a series of nails in a projecting position, and mechanism for forcing the nail carriers toward the shoe, whereby to force them through the holes in the horseshoe and into the horse's hoof.

For a full understanding of the invention and the merits thereof, and to acquire a knowledge of the details of construction, reference is to be had to the following description and accompanying drawings, in which:

Figure 1 is a perspective view of my improved mechanism; Fig. 2 is a side view of one of the sections of the device, the winding shaft being shown in section; Fig. 3 is a vertical transverse section; Fig. 4 is a fragmentary detail section showing a nail carrier raised; and, Fig. 5 is a perspective view of one section of the nail carrier detached from its surrounding parts.

Corresponding and like parts are referred to in the following description and indicated in all the views of the drawings by the same reference characters.

The mechanism is made in two opposed sections, both alike, except in one point as hereinafter stated. Each section consists of a semicircular base 2 from which extends the spaced standards 3. The upper ends of these standards converge toward each other, as at 4, and the upper ends of these converging portions carry the ring-like bearings 5 having pivot pins 6, as shown particularly in Fig. 3, projecting down into sockets in the upper ends of the converging standards, whereby the bearings may have rotation in a horizontal plane.

Each of the sections carries one half of a shoe seat 7. These seat sections and the base sections 2 are hinged together at their forward ends, as at 7ª, and the seat sections are shouldered on their interior face, as at 8, the upper portion of the seat sections, above the shoulder, being large enough to surround a horseshoe A, while the shoulder forms a seat upon which the horseshoe will rest and be supported. Formed with or attached to the inner faces 4 of the converging ends of the spaced standards, are the outwardly projecting and somewhat convergent ears 9 which are adapted to fit over the front of the horse's hoof and hold it in position upon the shoe when the shoe is in proper position upon the shoe seat. Mounted upon the standards 3 are the slides 10 which are recessed at their ends, as at 10ª, for engagement with the standards. Each of the slides 10 supports a nail carrying block 11. Each nail carrying block is recessed upon its upper face and upon its outer margin, the recess conforming to the line of nails in a horseshoe and being located of course immediately beneath the shoe seat. The recess 12 may be provided with any desired magnetic means whereby a series of horse shoe nails may be supported in an upright position, the heads of the nails resting in the recess. This magnetic means, however, is not necessary to the operation of my invention, as will be seen in the description of the operation.

Attached to each of the slides is a hook 14, and passing through the bearings 5 is the winding shaft 16 connected to each of the hooks 14 by chains 15. It will be obvious that when the winding shaft is turned, the slides forming the nail carriers will be drawn upward toward the shoe supported on the shoe seat. Perforated guides 18 are attached to the upper ends of the standards, through which the chains 15 pass. So far both of the sections are precisely alike, but in order to clamp the sections rigidly together in an adjusted position, one of the base plates is formed with a bridge 20, while the opposite base plate is formed with a pivoted tongue 21 which enters beneath the bridge 20 and is engaged by a set screw passing through the bridge. I do not wish to be limited, however, to this means of clamping the sections in their relative position to each other. It is to be understood that the base of my mechanism is to be sufficiently heavy and solid so that when clamped upon a horse's hoof, it will hold the hoof firmly in place, and that the mechanism is to be made so strongly as to withstand the strain to which it is subjected.

The operation of the mechanism is as follows: A shoe is placed upon the shoe seat, the sections being brought relatively close to each other for this purpose, and the horse's hoof is to be inserted between the upper ends of the sections and to rest upon the shoe which is supported in the seat. The two sections are then to be clamped together so that the projecting ears 9 will fit over the front of the hoof and hold it in place. The shaft is then inserted through the bearings of the upper ends of the standards, and connected to the chains 15. A set of horse shoe nails is then placed within the recess or nail seat 12, the shanks of the nails projecting upward and the pointed extremities of the nails entering the openings or holes in the horse shoe but not projecting above the same. These parts being arranged as described, the winding shaft is turned, which will draw the carriers upward, forcing the nails through the horseshoe and into the horse's hoof. When the nails have been completely forced into the horse's hoof, the sections are removed for new operation. It will be seen that all the nails are forced in at one time, thus expediting the shoeing and very much simplifying it.

Having thus described the invention, what I claim is:—

1. A horse shoeing mechanism comprising a hoof support, a shoe seat mounted on the hoof support, means for clamping the hoof upon the support, a nail carrier movable toward the shoe seat and adapted to support a set of nails, and mechanism for forcing the carrier toward the shoe seat.

2. A horse shoeing mechanism comprising a hoof support, a shoe seat mounted on the hoof support, clamping members formed of sections movable toward and away from each other, a nail carrier movable toward the shoe seat and adapted to support a set of nails with their points projecting through the seat and the shoe thereon, and mechanism for forcing the carrier toward the shoe seat.

3. A horse shoeing mechanism comprising opposed standards having a hinged connection to each other, a horseshoe seat formed in two parts and attached to the standards so as to be clamped upon a horseshoe, means for supporting a horse's hoof upon the horseshoe, means for holding the standards in their adjusted position to clamp the shoe upon the seat, nail carriers movable upon the standards and provided with means for supporting a series of nails with the points of the nails projecting through the shoe seat and the shoe, and mechanism for forcing the nail carriers toward the shoe seat.

4. A horse shoeing mechanism comprising oppose base plates hinged to each other, opposed standards carried upon the base plates, a shoe seat formed in two parts hinged to each other, each part being carried upon one of the standards, opposed nail carriers shiftable on the standards to and from the shoe seat, means for supporting a set of horseshoe nails upon said carriers with the points projecting through the shoe seat and into the shoe, means for forcing the carriers toward the shoe seat, and means for clamping the base plates in relative adjusted positions.

5. A horse shoeing mechanism including a hoof support, a shoe seat, a nail carrier movable toward the shoe seat and having means for supporting a set of horseshoe nails, the points of the nails projecting toward the said seat, a winding shaft, connections between said winding shaft and the nail carrier for drawing the latter toward the shoe seat.

6. In a horse shoeing mechanism, a sectional base, the sections hinged to each other, opposed standards mounted on the sections of the base, a shoe seat formed in sections and mounted on the standards, a winding shaft supported above the shoe seat, a sectional nail carrier mounted on the standards and movable to and from the shoe seat, and connections between said sectional nail carrier and the winding shaft.

7. A horse shoeing mechanism comprising a sectional base plate, the sections being hinged to each other and provided with means whereby they may be angularly adjusted with relation to each other, opposed pairs of standards mounted on each of the sections of the base plate, the upper ends of each pair of standards converging, bearings formed in the upper ends of the standards, a winding shaft detachably mounted in said bearings, a shoe seat formed in two sections, one section attached to each of the pairs of standards, the said sections being hinged to each other and located below the winding shaft bearings, lugs above the shoe seat for holding the horse's hoof thereon, slides mounted between each pair of standards and movable to and from the shoe seat, nail blocks supported on said slides, each block being formed with an outer marginal channel forming a nail seat, and flexible connections between said slides and the winding shaft, whereby the slides may be drawn toward the shoe seat.

In testimony whereof I affix my signature in presence of two witnesses.

JAMES C. HANCOCK. [L. S.]

Witnesses:
 MINNIE LOYD,
 FERRIE WHITE.